United States Patent
Minarovic

(10) Patent No.: US 10,705,249 B2
(45) Date of Patent: Jul. 7, 2020

(54) ELECTRONIC MARKER WITH INTEGRAL LEVEL INDICATOR

(71) Applicant: Joe T. Minarovic, Georgetown, TX (US)

(72) Inventor: Joe T. Minarovic, Georgetown, TX (US)

(*) Notice: Subject to any disclaimer, the term of this patent is extended or adjusted under 35 U.S.C. 154(b) by 230 days.

(21) Appl. No.: 15/987,361

(22) Filed: May 23, 2018

(65) Prior Publication Data
US 2019/0361145 A1    Nov. 28, 2019

(51) Int. Cl.
| G01C 9/06 | (2006.01) |
| G01V 15/00 | (2006.01) |
| G01C 9/10 | (2006.01) |
| G01C 9/26 | (2006.01) |

(52) U.S. Cl.
CPC .............. *G01V 15/00* (2013.01); *G01C 9/06* (2013.01); *G01C 9/10* (2013.01); *G01C 9/26* (2013.01); *G01C 2009/066* (2013.01); *G01C 2009/107* (2013.01)

(58) Field of Classification Search
CPC . G01V 15/00; G01C 9/06; G01C 9/10; G01C 9/36
USPC .......................................... 33/332, 333, 390
See application file for complete search history.

(56) References Cited

U.S. PATENT DOCUMENTS

| 4,292,590 A | 9/1981 | Wilson |
| 4,712,094 A | 12/1987 | Bolson |
| 5,313,713 A * | 5/1994 | Heger ............... G01C 9/20 33/343 |
| 5,519,329 A | 5/1996 | Satterwhite |
| 6,507,016 B1 * | 1/2003 | Cooper ............. B60R 21/013 180/282 |
| 8,106,660 B1 | 1/2012 | Merewether et al. |
| 8,564,295 B2 | 10/2013 | Olsson et al. |
| 2001/0043071 A1 * | 11/2001 | Minarovic ............ F16L 1/11 324/326 |
| 2009/0059212 A1 * | 3/2009 | Lin .................... G01C 9/06 356/139.1 |
| 2009/0119938 A1 * | 5/2009 | Song .................. A63B 57/353 33/366.14 |
| 2011/0215808 A1 | 9/2011 | Cholayil |

(Continued)

FOREIGN PATENT DOCUMENTS

CN    205374764    7/2011

*Primary Examiner* — George B Bennett
(74) *Attorney, Agent, or Firm* — Jack V. Musgrove

(57) ABSTRACT

An electronic marker for locating obscured objects such as buried conduits has a built-in level indicator to provide a visual indication of when the marker has been properly oriented, e.g., a flat marker which should be positioned horizontally when deployed. The level indicator can be an air-bubble level formed from a transparent semispherical portion of the marker body with a partially-filled chamber. Alternatively, the level indicator can be a gravity-ball level with a circular ridge formed along the concave interior surface of the semispherical portion and a ball located within the ridge. In a further embodiment the level indicator is an electronic level having a tilt indicator circuit in which an electronic controller selectively illuminates light sources in response to signals from tilt sensors. The light sources may for example comprise four light-emitting diodes located at four respective corners of the marker body.

20 Claims, 3 Drawing Sheets

(56) References Cited

U.S. PATENT DOCUMENTS

| | | | | |
|---|---|---|---|---|
| 2014/0247051 A1* | 9/2014 | Minarovic | ............ | G01V 15/00 |
| | | | | 324/326 |
| 2015/0104254 A1* | 4/2015 | Minarovic | ............ | E02D 29/12 |
| | | | | 404/26 |
| 2015/0378051 A1* | 12/2015 | Kapoor | ................ | G01N 27/02 |
| | | | | 324/334 |
| 2016/0040989 A1* | 2/2016 | Wang | ...................... | G01C 9/32 |
| | | | | 33/301 |
| 2016/0377649 A1* | 12/2016 | Rytkonen | ............ | G01P 15/125 |
| | | | | 73/514.32 |
| 2018/0120130 A1* | 5/2018 | Varga | .................. | A61B 5/0015 |
| 2019/0277616 A1* | 9/2019 | Wilkinson | ............ | G01C 9/06 |
| 2020/0064132 A1* | 2/2020 | Schubert | ................ | G01C 9/02 |

\* cited by examiner

ELECTRONIC MARKER WITH INTEGRAL LEVEL INDICATOR

BACKGROUND OF THE INVENTION

Field of the Invention

The present invention generally relates to devices used to mark and locate obscured objects, and more particularly to an electronic marker having a built-in level function.

Description of the Related Art

Buried conduits are employed for supplying a wide variety of utilities, including pipelines for gas, water and sewage, and cables for telephone, optical fiber, power and television. It is often necessary to locate manhole covers, which are used for entrance or access to these conduits or vaults, in order to repair, modify, or replace the hatch or cover. Oftentimes when laying out a new road, a pavement crew will pave over a manhole cover with asphalt or concrete, and a different crew will come later to remove the material overlying the manhole cover so it can be raised or otherwise aligned with the street level. Conversely, it is important to know with as much accuracy as possible the approximate vicinity of such buried objects in order to avoid disturbing them when digging or excavating for other purposes. Above-ground marking devices may be installed immediately after the manhole cover is buried, but it is also common to use underground marking devices or systems to enable the later location of a utility access hatch.

In the past, different approaches have been used to indicate the presence of buried access hatches, namely, warning tape, painted symbols or surface markings, and electronic marker systems. A warning tape is simply a band of plastic which is placed above the manhole cover before burial. These tapes are used to alert the excavation team of the presence of the manhole before any damage thereto might occur. As the backhoe or other mechanical digger excavates the site, it will hopefully uproot a portion of the warning tape prior to contact with the manhole. Painting symbols on the ground is another common method of indicating the location of buried utility components. A worker can simply paint markings at the area above or near the buried component, and at a later time (using visual identification) pinpoint the location previously marked. Other types of visual surface markings can be used in place of painted markings, such as adhesive markers attached to the surface, or small metallic markers embedded into the ground so as to be level with the surface.

Electronic marker systems for locating buried objects are known in the art, and generally consist of two types, namely, active and passive markers (or transponders). Active markers require the use of a power supply which amplifies a signal source (usually an AC signal). The signal is radiated by the underground marker and detected by a receiver unit above ground. Active markers may be "smart", that is, contain encoded data which is transmitted with the locator beacon. Passive markers, in contrast, have no power supply, but rather operate in a resonant mode, responsive to a transmitted electromagnetic field, and are usually limited to detection of a single frequency signal. A passive marker is basically a wire coil and capacitor surrounded in a protective envelope, which is then buried adjacent to the cable, pipe, or other object to be located. The marker is self-contained, with no external, accessible connections. Passive markers are activated by radiating a signal into the ground in the area where the marker is expected to be found. The signal is emitted via an inductive coil held close to the surface (the transmitter portion of a transceiver). When the coil is directly over, or near, the passive marker (which is itself an inductive coil), the marker accepts energy within its bandpass and stores it, reaching a sustained amplitude during the transmission cycle. When the transmission cycle ends, the marker re-emits the energy at the marker's resonant frequency with an exponentially decaying amplitude. A second coil within the transceiver unit acts as a receiving antenna which detects the re-radiated energy, alerting the locating technician with an audible tone or other indicator means.

Electronic markers, as well as warning tapes, are usually color-coded according to the particular type of utility line they mark. Specifically, gas line markers are yellow; telephone cable markers are orange; waste water tunnel markers are green; water pipe markers are blue; and power supply markers are red. Similarly, the passive marker is "coded" by tuning the coil for a specific resonant frequency. Five distinct frequencies have been designated: 83.0 kHz for gas; 101.4 kHz for telephone; 121.6 kHz for sewage; 145.7 kHz for water; and 169.8 kHz for power. In this manner, a locating technician searching for, say, a gas line, cannot accidentally activate a telephone marker since his transmitter will only be sending out an 83 kHz signal, which is not within the bandwidth for a telephone marker tuned for 101.4 kHz. These frequencies have been designated by convention, and are not otherwise restrictive.

There are several kinds of passive markers for different applications. These include small, near-surface markers for locating objects just inches below the surface, medium size or mid-range markers, full-range markers for locating more deeply buried objects, and self-aligning markers such as the so-called ball marker which supports the marker coil horizontally, regardless of the orientation of the housing. There are hybrid systems wherein, for example, a signal is applied to a buried conductor (cable or trace wire), and coupled through the conductor to one or more markers buried adjacent the conductor. Also, a marker can be used to couple one conductor to another, so that the test signal may be conveyed to the second conductor without a direct physical connection. All of these markers generally float around the underground feature in the soil, and are subject to soil movement.

SUMMARY OF THE INVENTION

The present invention in at least one embodiment is generally directed to an electronic marker having a marker body defining a plane, an interrogatable electronic circuit located in said marker body such as a passive resonator, and a level indicator integrally formed with said marker body for providing a visual indication of a desired orientation of the plane of the marker body, such as horizontal. In one embodiment the level indicator is an air-bubble level formed from a transparent semispherical portion of the marker body forming a chamber which is partially filled with a liquid leaving an air bubble, with a printed circle to indicate when the air bubble is centered in the semispherical portion. Alternatively, the level indicator can be a gravity-ball level formed from the transparent semispherical portion of transparent marker body having a concave interior surface with circular ridge and a ball located within the ridge. In a further embodiment the level indicator is an electronic level embedded in the marker body. The electronic level can include a tilt indicator circuit having a battery, a plurality of light sources visible external to the marker body, one or more tilt sensors, and an electronic controller which selectively illuminates the light sources in response to signals from the tilt sensors. The light sources may for example comprise four light-emitting diodes located at four respective corners of the marker body.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Figure 1A:
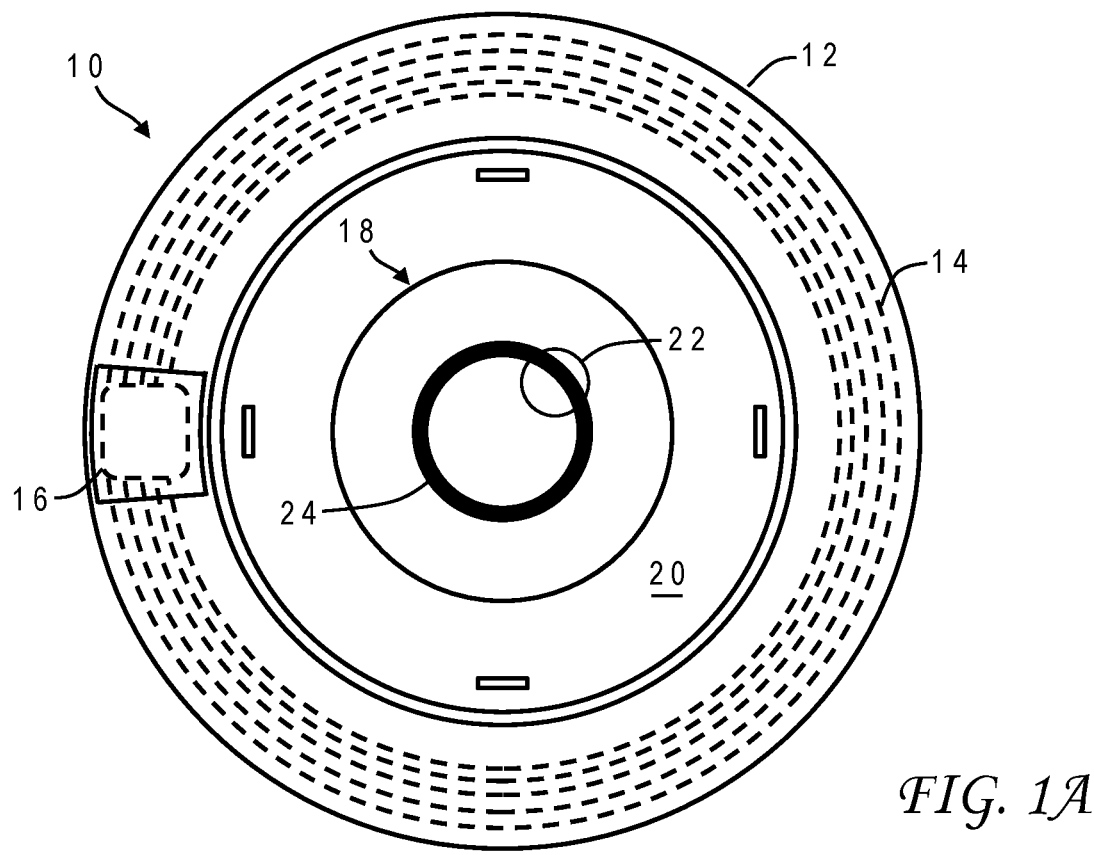
FIGS. 1A and 1B are a top plan view and a side elevational view, respectively, of an electronic marker with a built-in level (bubble level) in accordance with one embodiment of the present invention.

Electronic markers are invaluable in marking buried conduits and other obscured objects so they can be safely located and accessed. There are, however, still some problems associated with the use of most electronic markers. One such problem relates to the orientation of the signal antenna (or wire coil) of an electronic marker. These antennas are generally directional. For example, many electronic markers have a wire coil that lies in a flat plane which is intended to be deployed in a horizontal manner, such that the direction of maximum signal strength is vertical (i.e., the normal to the plane of the coil). In this manner, when the marker is properly located underground, a technician at the surface with a locator device will sense the maximum strength of the signal when the locator is directly above the marker, thus pinpointing the underground location of the underground object. Unfortunately, the marker is not always oriented properly when placed, or its orientation may be disturbed, thereby changing the presumed location of the buried object (i.e., a parallax error). Smaller markers (lower signal strength) are particularly susceptible to this effect. For example, salt applied to a road during the winter might be shoveled off onto the shoulder where it can interfere with a nearby buried marker. In such a case, a 3' range marker could be limited to 1½', and if the marker were further disturbed it might not be detectable at all from the surface.

Various electronic marker designs have been devised to overcome this directionality problem, such as the ball marker of U.S. Pat. No. 4,712,094. In that design, a marker coil floats inside a ball-shaped housing that is partially filled with water, so that the coil maintains a horizontal orientation. This and other similar designs still have drawbacks. For example, the ball marker presents a new problem in that it is not neutrally buoyant due to the air pocket within the marker body. If the soil becomes loose or a trench the marker is in gets filled with water (sometimes intentionally to compact the dirt), the ball marker can float upward and sideways, changing the location point. It is also still possible that the coil with the marker body has not self-leveled. If there are any defects in either the inner surface of the marker body or the coil assembly, they can present a surface which catches the coil and keeps it from floating freely. Additionally, even a miniscule hole in the ball marker can allow water to slowly escape, impeding proper floating of the coil. In any event, the technician placing the ball marker cannot actually confirm that the coil is level or is otherwise operating properly. Even if the technician were to take a picture for verification purposes, a supervisor still would not be able to see that the coil is level It would, therefore, be desirable to devise an improved electronic marker which facilitated proper orientation of the marker body to ensure optimum operation. It would be further advantageous if the method could allow a visual confirmation that the marker has been properly deployed. These and other advantages are achieved in various embodiments of the present invention, by providing a built-in level device with the electronic marker. The level device may take many different forms including mechanical or electrical, and allows a technician to personally verify proper installation.

Figure 1B:
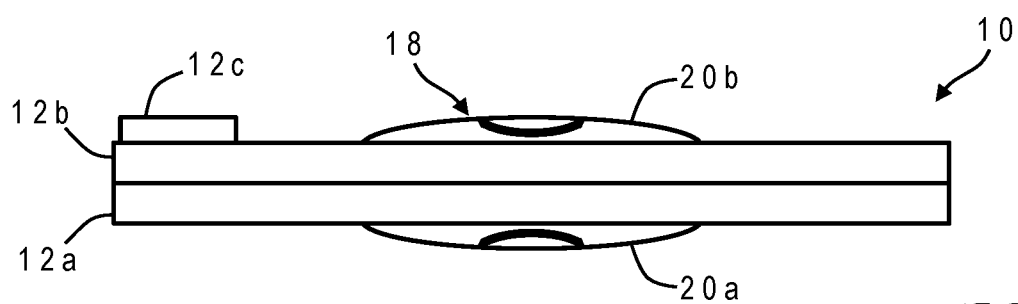

With reference now to the figures, and in particular with reference to FIGS. 1A and 1B, there is depicted one embodiment 10 of an electronic marker with an integral level indicator constructed in accordance with the present invention. In this embodiment electronic marker 10 is generally comprised of a marker body 12, a resonant wire coil 14 and capacitor 16 which together form a resonant antenna, and a level indicator 18. Marker body 12 may be constructed of any durable material, preferably a polymer, and is circular in shape for this embodiment, with wire coil 14 positioned around the periphery. Marker body 12 is also relatively flat or planar, defining a plane for deployment of electronic marker 10; that plane should be horizontal when deployed to ensure that the antenna signal direction (normal of the plane defined by the wire coil) is generally vertical. As explained further below, the entire marker body may be clear but at least a portion of the marker body around level indicator 18 is clear (or partially clear); an exemplary material is polypropylene. Marker body 12 may be formed as two separate pieces, a bottom 12a and a top 12b, which are then sonic welded together to encapsulate wire coil 14 and capacitor 16, with a cap or cover 12c for capacitor 16. These individual components may be formed by any convenient means such as molding or stamping. Marker body 12 may also have other features such as slots or holes for tie wraps or other implements to help secure electronic marker 10 to a particular object proximate the area to be marked for later location. Wire coil 14 and capacitor 16 form a resonant LC (inductor-capacitor) circuit to provide a passive transponder as is known in the art. While the following discussion uses passive markers as exemplary embodiments, those skilled in the art will appreciate that the present invention applies equally to active markers. Furthermore, electronic markers in accordance with the present invention may include additional features not shown. The dimensions of electronic marker 10 may vary considerably depending upon application; in the illustrative embodiment it is about 4½" in diameter and the main body thickness is about ¼".

In this embodiment, level indicator 18 is an air-bubble level and includes a lower semispherical portion 20*a* and an upper semispherical portion 20*b* integrally formed with marker body 12, i.e., lower semispherical portion 20*a* is integrally formed with marker body bottom 12*a* and upper semispherical portion 20*b* is integrally formed with marker body top 12*b*. The term "integrally formed" as used herein for mechanical constructions (as opposed to electronic) means that the parts are of a unitary construction, such as made in the same, single mold, or cut from the same starting block, so there is no discernable physical boundary or interface between the parts, or at least portions of the parts. Even with these semispherical portions marker body 12 is still generally flat or planar. The semispherical portions 20*a*, 20*b* are generally circular when viewed from top or bottom, and are concentric with marker body 12. The semispherical portions are preferably thin, such as $118^{th}$" thickness.

Semispherical portions 20*a* and 20*b* are transparent or translucent to allow viewing of an interior chamber 20 formed therebetween. Chamber 20 is mostly filled with a liquid such as water or oil, and is sealed (air-tight) between marker body bottom 12*a* and marker body top 12*b* to prevent the escape of the liquid. There remains sufficient air within chamber 20 to form a small bubble 22. The bubble size is selected (i.e., just enough water is added to the chamber) so that the bubble is slightly smaller than a level indication circle 24 painted, printed or otherwise formed (e.g., molded or engraved) on either the inner or outer surfaces of the semispherical portions 20*a*, 20*b*. Level indication circle 24 is also concentric with semispherical portions 20*a*, 20*b* and marker body 12, and more generally is positioned relative to the marker body and the curvature of the particular semispherical portion such that air bubble 22 will be centered within level indication circle 24 when the electronic marker is properly oriented, i.e., when the plane defined by marker body 12 is generally horizontal.

In this manner, a technician laying electronic marker 10 in a trench or hole can manually adjust its orientation, pushing down along one side or another of the marker (or adjusting any tie wraps or other attachment means), until it feels stable and air bubble 22 is mostly centered within level indication circle 24. For most deployments it is not necessary to achieve a perfect alignment of the air bubble with the level indicator circle; if the direction is within about 15° of plumb this is adequate for, e.g., a one foot wide backhoe tolerance.

Transparent, semispherical portions are provided in the embodiment of FIG. 1 on both the top and bottom of the marker to simplify installation by allowing the marker to be installed either right-side up or upside down and still have a visual indication (from a perspective above) that the marker was installed evenly. In an alternative embodiment there is only one semispherical portion on the top of the marker. Other details of the pictured embodiment may be altered to achieve further variations. For example, instead of an air bubble, the level indicator could use a small buoyant ball. There could also be two orthogonally positioned curved tubes each having an air-bubble level, so the marker is considered level when both air bubbles are centered within their respective tubes (the tubes being integrally formed with the marker body). A further variation of a liquid-fill type level indicator could use an opaque liquid within a vertically-disposed cylindrical cavity and a fill line traced along the interior surface of the cavity such that the marker is level when the meniscus of the opaque fluid is just touching the fill line.

Figure 2:
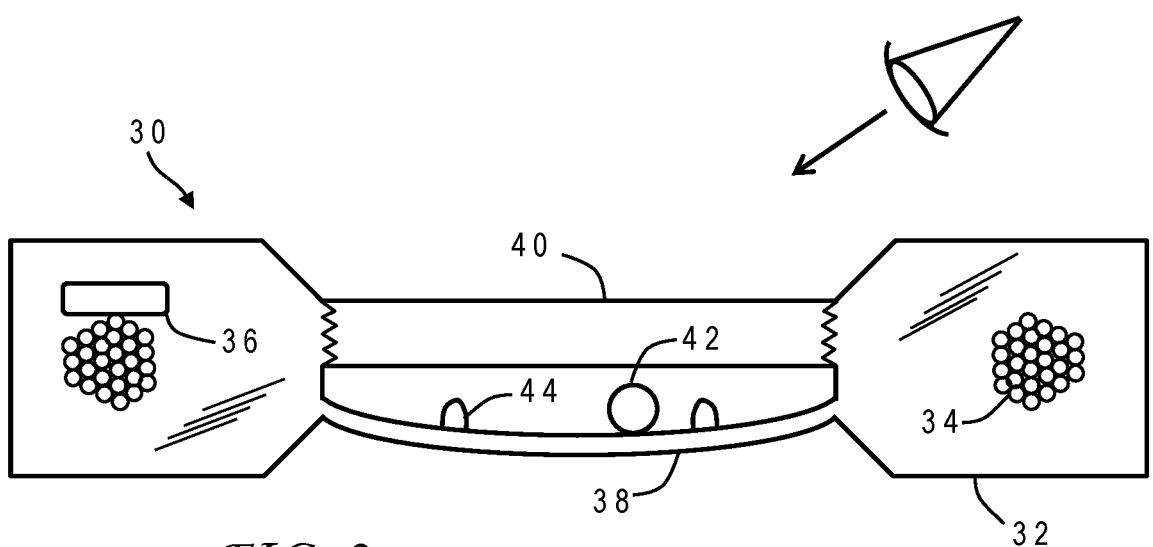
FIG. 2 is a side elevational view of another electronic marker with a built-in level (ball level) in accordance with an alternative embodiment of the present invention.

A further embodiment 30 of an electronic marker is seen in FIG. 2 which has an integrated level indicator but does not utilize any liquid. Electronic marker 30 has a generally planar, circular marker body 32 again preferably formed of a transparent material such as polypropylene, encasing a wire coil 34 and connected capacitor 36 forming the resonant antenna. Marker body 32 includes a semispherical portion 38 along the bottom side. In this embodiment the bulk of the marker body again has a unitary construction with the semispherical portion, i.e., they are formed integrally in the same molding or lathing process.

Semispherical portion 38 forms another interior chamber that is capped by a body insert 40. Body insert 40 may be attached to marker body 12 by any convenient means, such as threading, adhesives or sonic welding. It is not necessary in this embodiment that the chamber be air-tight. Body insert 40 is also made of a clear material (polypropylene). A heavy ball 42 is located in this chamber, and a ridge 44 is also formed along the concave interior surface of semispherical portion 38. The ridge and semispherical portion are both circular when seen from above, and are again concentric with marker body 32. Similar to the level indication circle 24 of electronic marker 10, ridge 44 is positioned relative to marker body 32 and the curvature of semispherical portion 38 such that ball 42 will be centered by force of gravity within ridge 44 when the electronic marker is properly oriented. Instead of a ridge forming a barrier for the ball, a well-defined circle could be printed or otherwise formed along the interior surface of semispherical portion 38. The ball thereby performs the leveling function in the interior of the chamber, and the technician placing marker 30 can view the ball as it is being centered by looking through the transparent body insert 40. This embodiment could also be altered by providing a top semispherical portion with another ridge so the electronic marker could be placed without regard to top/bottom orientation.

Figure 3:
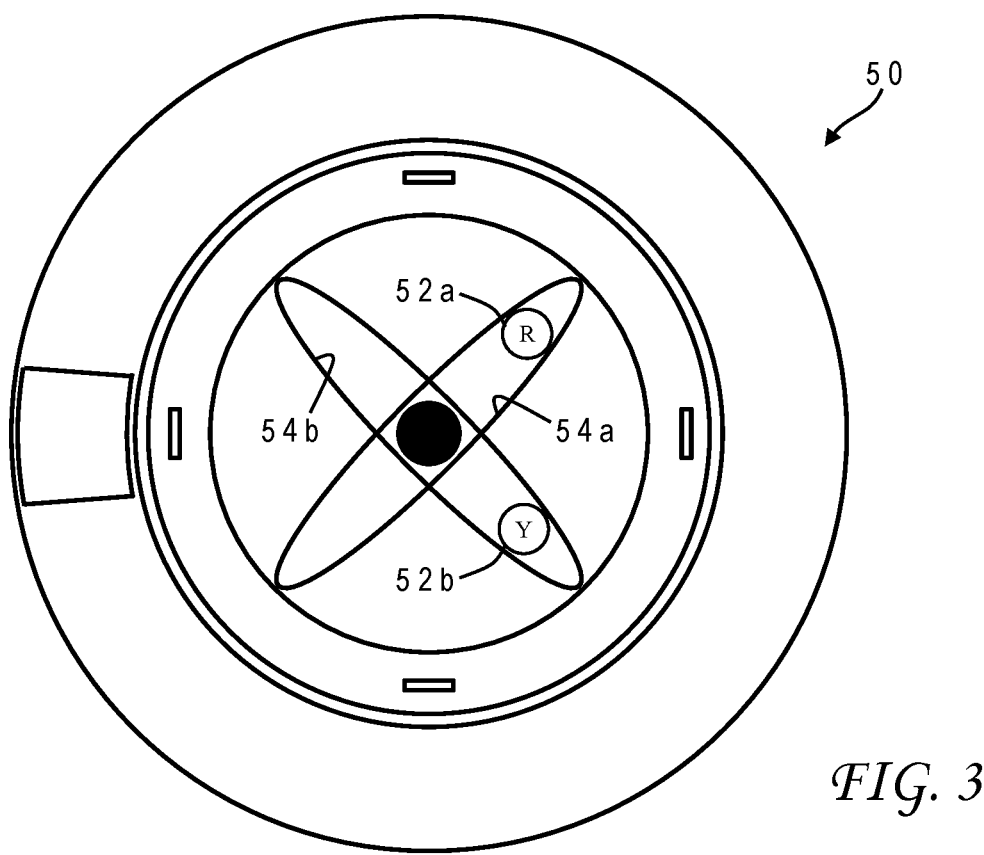
FIG. 3 is a top plan view of another electronic marker with a built-in level (2-ball level) in accordance with a further alternative of the present invention.
Figure 4:
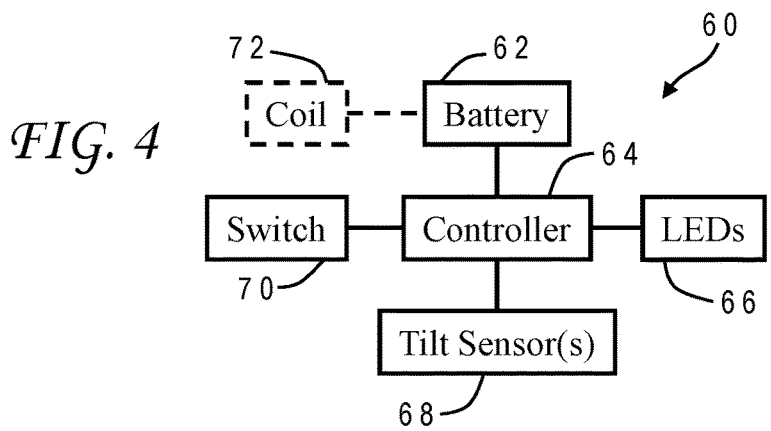
FIG. 4 is a high-level schematic diagram of an electronic circuit for an LED leveling system of an electronic marker in accordance with one embodiment of the present invention.

A slightly more complicated version of a gravity ball level indicator integrated into an electronic marker is seen in FIG. 3. This electronic marker 50 has a marker body which is formed from top and bottom pieces similar to the marker 10 of FIG. 1. However, each piece has a groove or trough formed therein with varying depth and two balls 52*a*, 52*b* are respectively placed in these grooves 54*a*, 54*b*. The thickness of the top and bottom pieces may need to be thicker to allow sufficient depth in the grooves to allow the balls to roll therein. In the preferred implementation the balls have different colors, e.g., one ball (52*a*) is red ("R") and the other ball (52*b*) is yellow ("Y"). A black spot is painted on either the interior or exterior surface of another transparent semispherical surface similar to 20*a*, 20*b* of FIG. 1B which retains balls 52*a*, 52*b* within their respective grooves. The semispherical surface, the marker body, and the spot are all concentric. In this manner, as electronic marker 50 is tilted to one side or another, the balls 52*a*, 52*b* will roll along their respective grooves and be centered under the black spot only when the marker body is generally horizontal, again providing a visual confirmation that the marker has been properly deployed.

The present invention may be extended to an electronic level indicator integrally formed with an electronic marker as seen in FIGS. 4 and 5A-5C. For electronic constructions, "integrally formed" means that the electronic components of the electronic level indicator are embedded within the marker body. In this embodiment, the electronic components comprise a tilt indicator circuit 60 is embedded within a marker body of another passive (wire coil) electronic marker 80. Tilt indicator circuit 60 includes a battery 62, an electronic control 64, a plurality of light-emitting diodes (LEDs) 66, one or more tilt sensors 68, and (optionally) an on/off switch 70. Battery 62 may be installed with sufficient charge to enable at least one deployment of the marker, i.e., with sufficient charge to last more than enough for the technician to place the marker and orient as explained below. Alternatively, a small charge can be made to battery 62 using an appropriate interface to the wire coil of the passive marker. Tilt sensors are gravimetric, i.e., they provide a signal indicative of whether they are currently oriented in a particular position (horizontal or vertical). In the illustrative embodiment there are two tilt sensors whose operative directions are orthogonal to provide two different signals indicating tilt of the marker body, i.e., pitch and roll, but there could be only one isotropic tilt sensor, i.e., a single sensor that sends out multiple signals to indicate a primary direction of inclination. When switch 70 is turned on, controller 64 receives these signals and activates LEDs 66 in a manner to indicate the current orientation of the marker body. For example, if a first tilt sensor indicates a non-horizontal inclination along one axis toward one direction, controller 64 can light a corresponding LED located at one side of the marker body, and if the first tilt sensor indicates a non-horizontal inclination toward the opposite direction, controller 64 can light a corresponding LED located at an opposite side of the marker body. The same function can be provided for another axis using a second tilt sensor and another pair of oppositely positioned LEDs. Thus, in this implementation, there are four LEDs 66a-66d located at four corners of the marker body (upper right 66a, upper left 66b, lower left 66c, lower right 66d), but there could be as few as three.

Figure 5A:
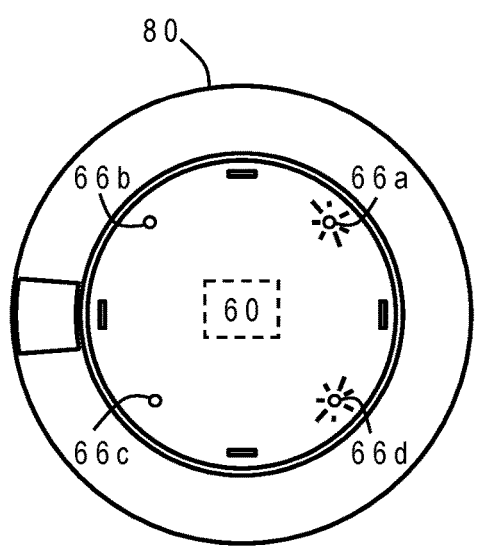
FIGS. 5A-5C are top plan views illustrating the operation of an LED leveling system during a leveling operation of an electronic marker in accordance with one embodiment of the present invention.
Figure 5B:
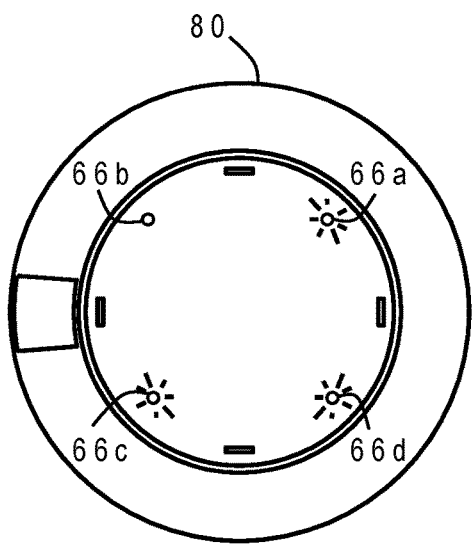
Figure 5C:
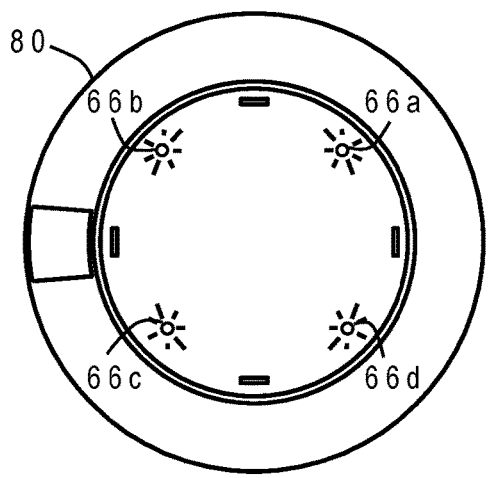

Operation of tilt indicator circuit 60 during deployment of electronic marker 80 is shown in FIGS. 5A-5C, as it would be seen from above by the technician. According to this example, the electronic marker is initially tilted generally downward to the left side as it is laid on top of dirt in a trench overlying the object to be marked, represented by FIG. 5A. Controller 64 thus activates LEDs 66a and 66d, without activating LEDs 66b or 66c, to indicate the right side is too high and needs to be lowered. In FIG. 5B, the technician has lowered the upper right corner of the marker but the bottom right corner is still too high, resulting in the additional illumination of LED 66c, i.e., the fact that opposing LEDs 66a and 66c are now both illuminated indicates that the marker body does not need to be further inclined along an axis therebetween, only along the axis between LEDs 66b and 66d. In FIG. 5C, the technician has slightly pushed down the bottom right corner bringing the marker body into a horizontal orientation, and controller 64 illuminates all four of the LEDs to confirm the proper placement. In a more complicated implementation, the marker can include an active wireless signal generated by controller 64 to confirm to the locating device that the marker is horizontal, or what its off-horizontal tilt direction is, further assisting in the locate operation.

Those skilled in the art will appreciate that the invention thereby provides an improved method of ensuring proper deployment of electronic markers, and can be used for all electronic marker applications. This allows the technician to photograph "flat" installations thereby meeting work requirements. An electronic marker of the present invention may be used in conjunction with other systems such as global positioning satellite (GPS) record-keeping or geographic information systems (GIS) to provide a superior marking/locating experience.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been described with reference to a generally disk-shaped marker but it could be applied regardless of marker shape. There could also be a hybrid mechanical-electronic level such as a gravity ball formed of a conductive material that comes into contact with two or more conductive pads when the marker is level and thereby closes an electronic circuit to indicate a horizontal orientation. It is therefore contemplated that such modifications can be made without departing from the spirit or scope of the present invention as defined in the appended claims.

What is claimed is:

1. An article for marking an obscured object comprising:
    a marker body defining a plane;
    an interrogatable electronic circuit located in said marker body, said interrogatable electronic circuit being responsive to an activation signal to send a marker identifier signal; and
    means integrally formed with said marker body for providing a visual indication of a desired orientation of the plane of said marker body.

2. The article of claim 1 wherein the desired orientation of the plane is a horizontal orientation.

3. The article of claim 1 wherein the activation signal and marker identifier signal are both wireless signals.

4. The article of claim 1 wherein said interrogatable electronic circuit is a passive resonator.

5. The article of claim 1 wherein said providing means includes an air-bubble level formed from a semispherical portion of said marker body and located at a center of said marker body, said semispherical portion forming a chamber which is partially filled with a liquid leaving an air bubble, and having an indication of when the air bubble is centered in said semispherical portion.

6. The article of claim 5 wherein said indication is a circle printed on said semispherical portion, said semispherical portion is circular, said marker body is circular, and said circle, semispherical portion and marker body are all concentric.

7. The article of claim 5 wherein said semispherical portion is transparent.

8. The article of claim 5 wherein said semispherical portion is a first semispherical portion located along a top of said marker body, and said air-bubble level is further formed from a second semispherical portion located along a bottom of said marker body, said first and second semispherical portions together forming said chamber and said second semispherical portion having another indication of when the air bubble is centered in said second semispherical portion.

9. The article of claim 1 wherein said providing means includes a gravity-ball level formed from a semispherical portion of said marker body and located at a center of said marker body, said semispherical portion forming a chamber having a concave interior surface with a ball located within the chamber and having an indication of when said ball is centered in said semispherical portion.

10. The article of claim 9 wherein said ball is a first ball and the concave interior surface is a first groove lying along a first direction, and said gravity-ball level further includes a second ball located in a second groove lying along a second direction different from the first direction.

11. The article of claim 9 wherein said indication is a circular ridge formed along the concave interior surface with said ball being contained within the ridge, said semispherical portion is circular, said marker body is circular, and said ridge, semispherical portion and marker body are all concentric.

12. The article of claim 1 wherein said providing means includes an electronic level embedded in said marker body.

13. The article of claim 11 wherein said electronic level includes a tilt indicator circuit having a battery, a plurality of light sources visible external to said marker body, one or more tilt sensors, and an electronic controller which selectively illuminates said light sources in response to signals from the one or more tilt sensors.

14. The article of claim 1 wherein said light sources include four light-emitting diodes located at four respective corners of said marker body.

15. An electronic marker comprising:
a flat marker body defining a plane;
an interrogatable electronic circuit located in said marker body, said interrogatable electronic circuit being responsive to an activation signal to send a marker identifier signal; and
a visual level indicator integrally formed with said marker body providing a visual indication of when the plane of said marker body is horizontal.

16. The electronic marker of claim 15 wherein said interrogatable electronic circuit is a passive resonator having a wire coil whose axis is normal to the plane, and the activation signal and marker identifier signal are both wireless signals.

17. The electronic marker of claim 15 wherein:
said visual level indicator is an air-bubble level formed from a circular semispherical portion of said marker body, said semispherical portion forming a chamber which is partially filled with a liquid leaving an air bubble, and having a printed circle;
said marker body is circular; and
said circle, said semispherical portion and said marker body are all concentric.

18. The electronic marker of claim 15 wherein:
said visual level indicator is a gravity-ball level formed from a circular semispherical portion of said marker body, said semispherical portion forming a chamber having a concave interior surface with a ball located within the chamber, and having a circular ridge formed along the concave interior surface with said ball being contained within the ridge;
said marker body is circular; and
said ridge, said semispherical portion and said marker body are all concentric.

19. The electronic marker of claim 15 wherein said visual level indicator is an electronic level embedded in said marker body, said electronic level including a tilt indicator circuit having a battery, four light-emitting diodes located at four respective corners of said marker body visible external to said marker body, one or more tilt sensors, and an electronic controller which selectively illuminates said light-emitting diodes in response to signals from the one or more tilt sensors.

20. An electronic marker with built-in leveling comprising:
a circular, generally flat marker body defining a plane;
a passive resonator circuit having a wire coil whose axis is normal to the plane and being responsive to a wireless activation signal to send a wireless marker identifier signal, wherein the wire coil is embedded within said marker body proximate a periphery thereof; and
an air-bubble level integrally formed from a circular semispherical portion of said marker body, said semispherical portion forming a chamber which is partially filled with a liquid leaving an air bubble, and having a printed circle, wherein said circle, said semispherical portion and said marker body are all concentric such that the air bubble being within the circle provides a visual indication of when the plane of said marker body is horizontal.

* * * * *